Feb. 18, 1941.                C. J. DEAL ET AL                2,232,097
                            DIRECT CURRENT MOTOR
                            Filed Feb. 24, 1939              4 Sheets-Sheet 4
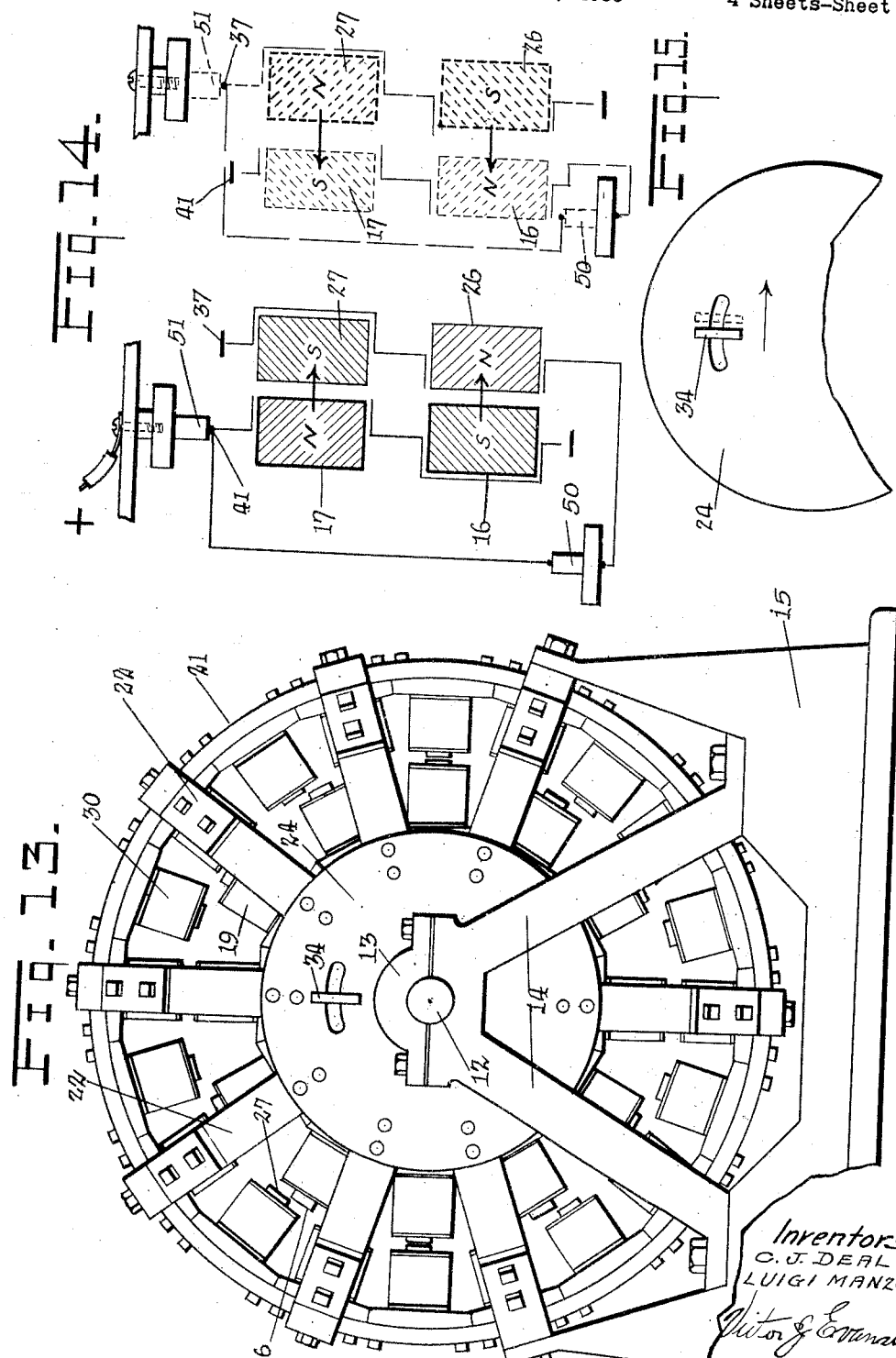
Inventors
C. J. DEAL
LUIGI MANZO
Attorneys Patented Feb. 18, 1941

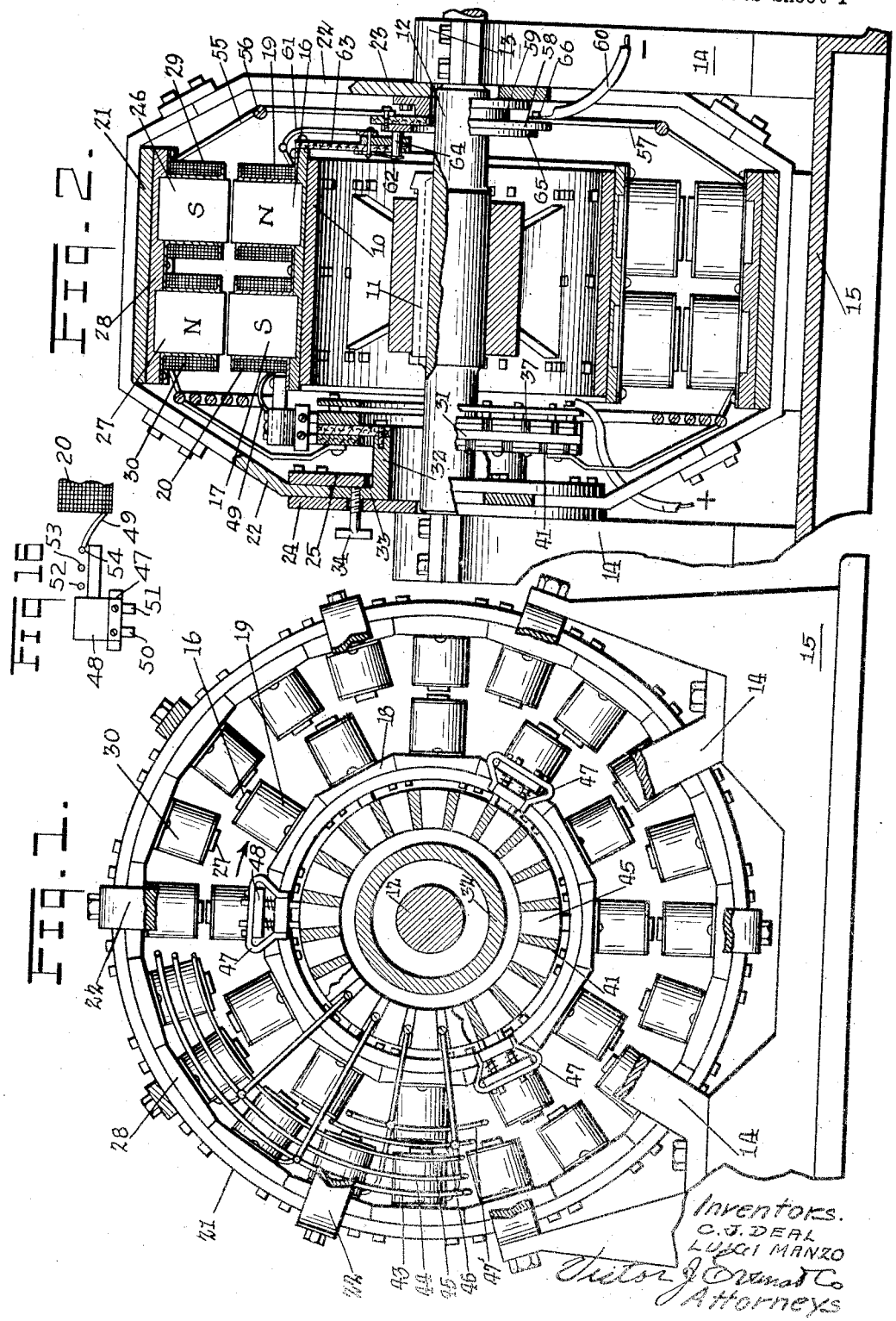

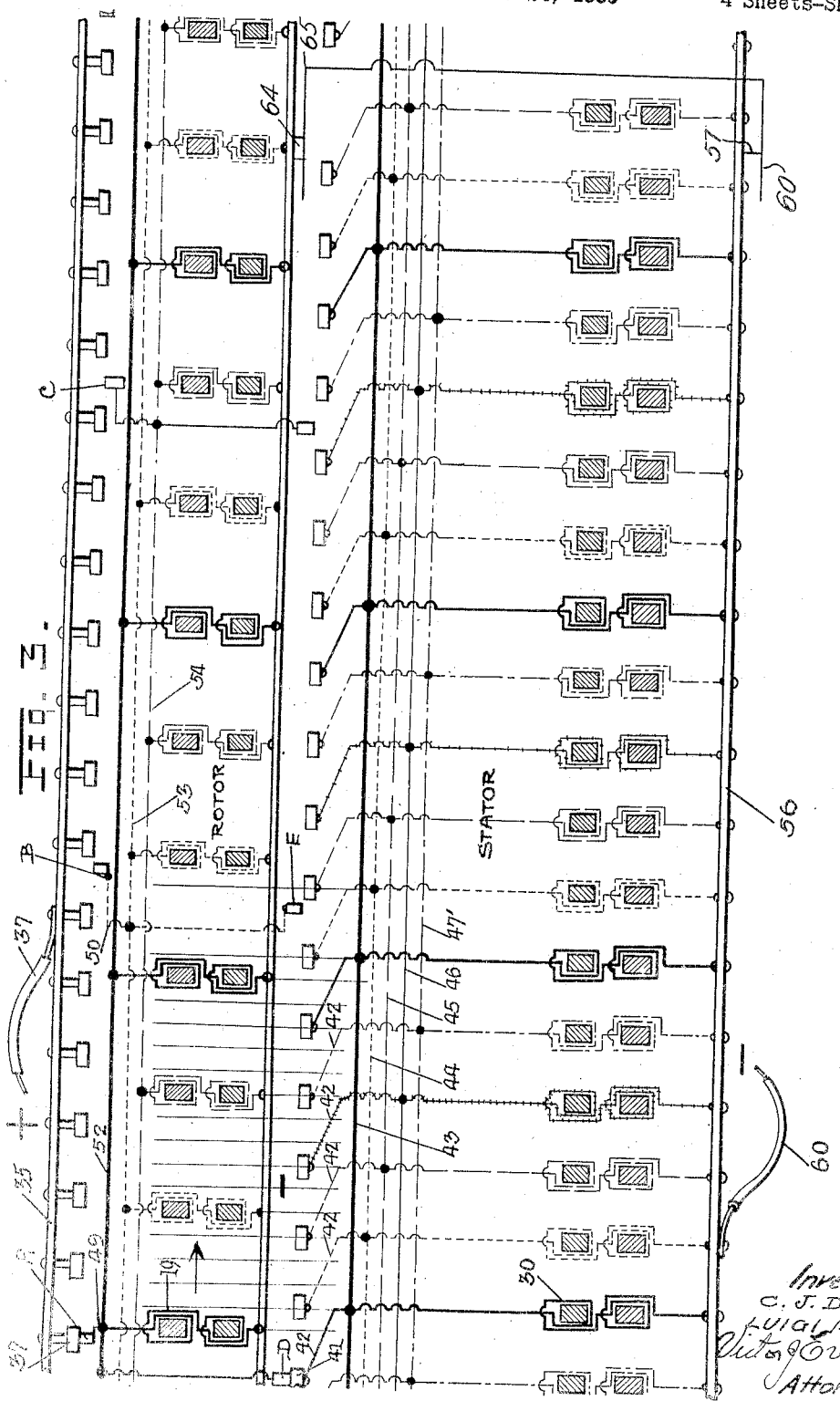

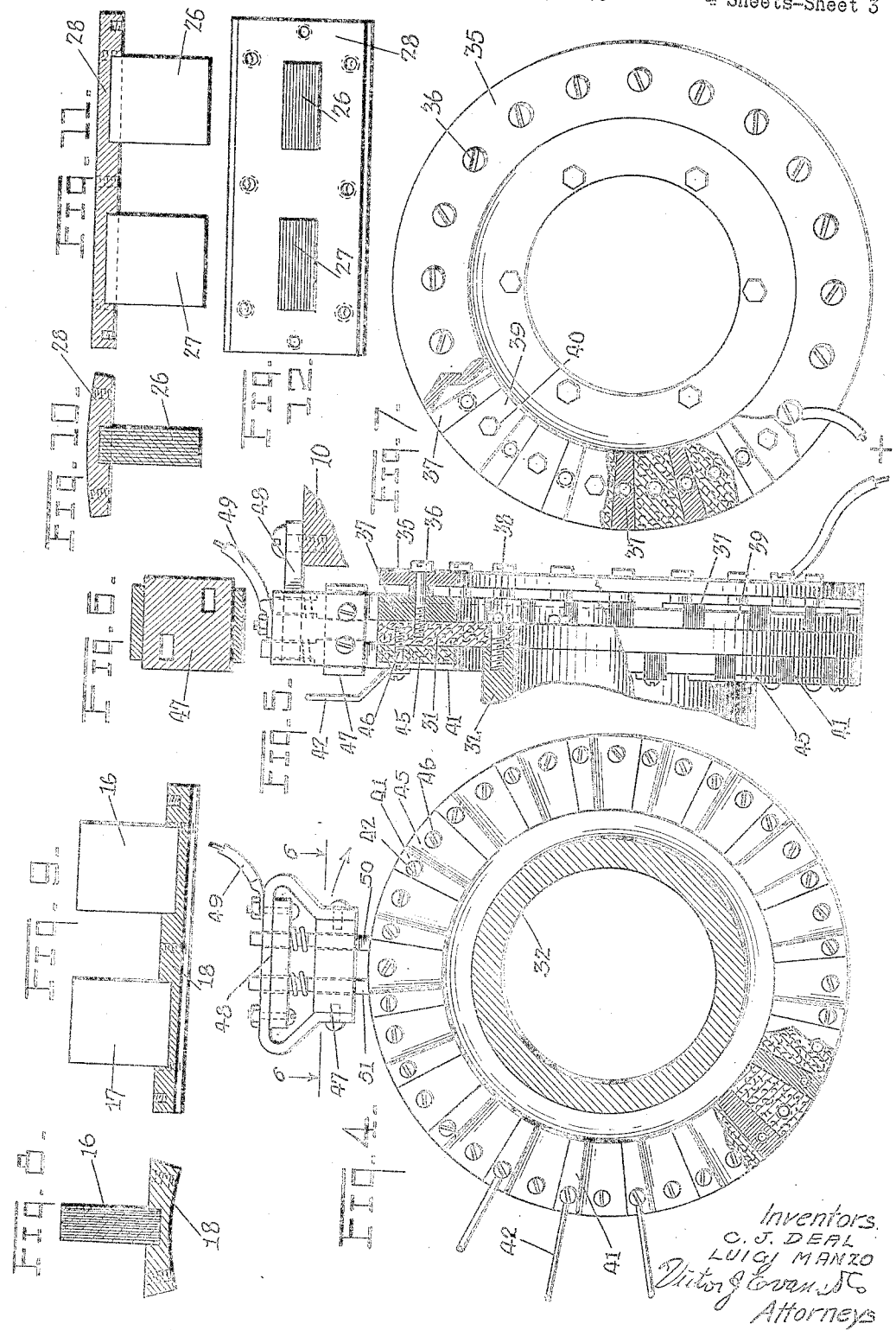

2,232,097

UNITED STATES PATENT OFFICE 2,232,097

DIRECT CURRENT MOTOR

Charles J. Deal and Luigi Manzo, Santa Barbara, Calif.

Application February 24, 1939, Serial No. 258,275

4 Claims. (Cl. 172—36)

This invention relates to direct current motors and has for an object to provide a motor having a different number of poles on the rotor than on the stator so that dead centers will be eliminated.

A further object is to provide a direct current motor having two annular rows of electro-magnets on both the stator and the rotor, one annular row being of north polarity and the other of south polarity, thus increasing the magnetic flux with resultant increase in torque.

A further object is to provide an electric motor which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a side elevation of an electric motor constructed in accordance with the invention, with portions broken away.

Figure 2 is a cross sectional view of the motor.

Figure 3 is a diagrammatic view showing the wiring of the motor.

Figure 4 is a front elevation of the distributor and one of the brushes, parts of the distributor being broken away.

Figure 5 is an end elevation of the distributor and brush holder with parts broken away.

Figure 6 is a cross sectional view of a brush holder taken on the line 6—6 of Figure 4.

Figure 7 is a rear elevation of the distributor with parts broken away.

Figure 8 is a cross sectional view of one of the rotor pole pieces.

Figure 9 is a longitudinal sectional view of one of the rotor pole pieces.

Figure 10 is a cross sectional view of one of the stator pole pieces.

Figure 11 is a longitudinal sectional view of one of the stator pole pieces.

Figure 12 is a bottom plan view of one of the stator pole pieces.

Figure 13 is a side elevation of the motor showing the reversing mechanism.

Figure 14 is a diagrammatic view showing the stationary distributor moved one pole pitch to reverse the motor.

Figure 15 is a fragmentary side elevation of the reversing mechanism.

Figure 16 is a fragmentary view, showing the connection between the rotor coils and brushes.

Referring now to the drawings in which like characters of reference designate similar parts in the various views, 10 designates a rotor drum which is keyed as shown at 11 to the motor shaft 12. The ends of the shaft are journaled in bearings 13 which are mounted on standards 14, best shown in Figure 13, secured to a base 15.

The rotor drum is provided with two annular rows of pole pieces 16 and 17 preferably formed of pairs of laminated sheets mounted on a common base plate 18, as best shown in Figure 9, which are bolted or otherwise secured to the rotor drum, as best shown in Figure 1.

In the form of the invention illustrated there are 12 of these pole pieces in each row extending radially from the drum. The coils 19 and 20 of each pair of pole pieces carried by a respective base plate, are wound oppositely to each other so that one annular row of electro-magnets will have north polarity while the other annular row of electro-magnets will have south polarity.

The stator ring 21 is carried by a suitable frame, mounted on the base 15, and comprising radially disposed arms 22. The arms on one side of the frame radiate from a common center plate 23 which is orificed to receive the respective end of the shaft 12 while the arms on the other side of the frame are provided with spaced plates 24 and 25 between which the support of the stationary distributor hereinafter described, is mounted.

Two annular rows of pole pieces 26 and 27 are mounted on the stator ring to confront the pole pieces of the rotor. The stator pole pieces are also preferably formed of laminated material, the pole pieces being arranged in pairs secured to a common base plate 28, as best shown in Figures 11 and 12 which may be bolted or otherwise secured to the stator ring. The coils 29 and 30 of each pair of pole pieces are wound in opposite directions so that one annular row of stator electro-magnets is of north polarity while the other annular row is of south polarity. The south polarity stator electro-magnets confront the north polarity rotor electro-magnets as best shown in Figure 2. In the form of the invention illustrated there are 20 of these pole pieces in each row extending radially from the ring.

The distributor 31 is stationary and is bolted to the inner end of a sleeve 32, as best shown in Figure 5. The sleeve is disposed concentric with the shaft 12 and is provided at the outer end with a flange 33 which is confined between the two frame plates 24 and 25 previously mentioned, as best shown in Figure 2. The flange is held stationary by a T-head bolt 34 which is advanced against the inner plate 25. When the bolt is loosened the distributor may be rotated one pole pitch for reversing the motor as will be hereinafter described.

A copper ring 35, as best shown in Figure 5, is attached to the inner face of the distributor by bolts 36, twenty in number, in the present embodiment. The direct current is brought into the motor by attaching the positive lead 37 to this ring. Copper segments 37, twenty in number in the present embodiment, are attached to the inner face of the distributor by the bolts 36 and are electrically connected to the copper ring by these bolts.

The ring is spaced laterally from the segments by spacers 38 disposed on the bolts so that the segments are individually energized as in a conventional commutator. Segments 39 of insulating material are bolted to the inner face of the distributor by bolts 40, between the copper segments.

Likewise, twenty copper radially extending segments 41 are bolted to the outer face of the distributor as shown at 42 in Figure 4. These segments are staggered with respect to the segments 37 on the inner face of the distributor. Segments 45 of insulating material are bolted to the face of the distributor between these segments by bolts 46.

As best shown in Figure 1, three brush holders 47 are mounted on insulating brackets 48 which are bolted to the rotor drum 10, as shown at 49 in Figures 2 and 5. The brush holders rotate with the rotor and are arranged at an angular distance of 120 degrees apart in the present embodiment. Each brush holder is equipped with a pair of spring pressed brushes 50 and 51 which have rubbing contact respectively with the copper segments 37 on the inner face of the distributor and with the copper segments 41 on the outer face of the distributor.

The brushes of each holder are electrically connected together by the metal of the brush holder or otherwise and it will be pointed out that the brushes are disposed in staggered relationship, as best shown in Figure 4, to correspond with the staggered relationship of the segments on the inner and outer faces of the distributor. Consequently, while the brush 50 will have rubbing contact with one of the segments 37 on the inner face, the other brush 51 will have rubbing contact with one of the segments on the outer face of the distributor.

The three brush holders revolve with the rotor drum and the brushes wipe over and make electrical contact with the copper segments of the stationary distributor. Current is supplied from the copper ring 35 through the brushes to the segments 41 on the outer face of the distributor and from these segments to the stator coils. The rotor coils are supplied with current direct from the brushes.

To each brush holder four rotor coils, 90 degrees apart, are connected in parallel, as best shown diagrammatically by full lines in Figure 3. Reading progressively from left to right of the figure, coils 1—4—7—10 are connected to brush A. Coils 2—5—8—11 are connected to brush B. Coils 3—6—9—12 are connected to brush C. Thus when the motor is rotated clockwise brush A will energize four coils 90 degrees apart when brush A is on one of the segments 37.

The length of time or part of the revolution that the four coils will be energized depends upon the angular width of the segment 37 and on the thickness of the brushes. In the present embodiment of the invention the segments are one-third of the angular distance between center lines of successive pole pieces 16, in angular width, or one-third the polar pitch. The insulating segments 39 between the copper segments 37 are each two-thirds polar pitch in angular width. The brushes are slightly less in thickness than the copper segments. Thus the part of a revolution through which a brush and a segment are engaged is a distance of slightly less than two-thirds polar pitch. Four rotor electro-magnets are energized in sequence around the rotor each time the advancing edge of a brush makes contact to the instant the trailing edge leaves a copper segment.

Referring to Figures 1 and 4 it will be seen that from each distributor segment 41 a lead 42 is connected. The leads 42 are interconnected by annular wires 43, 44, 45, 46 and 47', best shown in Figure 1, the arrangement being such that any one brush when in contact with a segment will energize four stator electro-magnets simultaneously, as best shown in Figure 3. Thus brush D will simultaneously energize the four electro-magnets shown in full lines, that is, reading from left to right coils 2—7—12—17. Brush E will energize coils 3—8—13—18. Brush F will energize coils 4—9—14—19. Thus four stator coils will be energized simultaneously 90 degrees apart when the brushes progressively engage the stator segments on the stationary distributor.

Since the stator segments have a slight lead on the rotor segments the stator coils 90 degrees apart will be progressively energized shortly before opposed rotor coils at the same points.

Due to there being a different number of poles on the rotor than on the stator, dead center is eliminated and also the attracting distance of working pairs of poles is reduced and the density of the magnetic flux greatly decreased.

As shown best in Figures 2 and 3 the brushes A, B and C are connected by respective leads 49, 50 and 51 to respective wires 52, 53 and 54 which latter each connect four rotor coils 90 degrees apart in parallel and these latter wires may be laid in a cable between the rotor coils or arranged in some other convenient manner.

The negative leads of the stator coils, as best shown in Figures 2 and 3, are connected to a common annular conductor 56 supported by radially disposed wires 57 which are secured to a plate 58 of insulating material carried by a flanged supporting ring 59 which is secured to the frame plate 23 at the opposite end of the shaft 12 from the distributor. The main negative lead 60 is connected to one of these wires 57.

The negative leads 61 of the stator coils are connected to a brush holder 62 which is mounted on a plate 63 of insulation. The plate is bolted to the rotor drum 10. The brush 64 engages a collector ring 65 carried by the insulating plate 58. The securing bolts 66 of the collector ring are passed through the wires 57 to electrically connect the collector ring with the main negative lead 60.

In operation current from the main positive lead 37 divides at the brushes 50 and 51, part passing to four rotor coils 90 degrees apart and part passing to four stator coils at the same points but with a slight lead on the rotor coils. From these stator coils and rotor coils current passes to the negative lead 60 respectively through the wires 57 and collector ring 65. Energizing of these coils as described imparts rotation to the motor in either a clockwise or counter-clockwise direction according to the setting of the reversing mechanism 34. For the purpose of a clear understanding of the operation certain of the rotor coils 19 in Figure 3 will be indicated by affixing letters to the numerals, as shown at 19a, 19b and 19c. Similarly literal affixes will be given to certain of the stator coils 30, such coils being shown at 30a, 30b and 30c, and segments 37 and 41 will be likewise given literal affixes. The rotor, in Figure 3, travels from left to right. As there shown contact or brush A is in engagement with positive feed segment 37a and brush D is similarly engaged with segment 41a. At this instant the coils 30a will be slightly in advance of coils 19a and both will be energized so that magnetic flux will occur between coils 30a and 19a tending to move the rotor to the right. As the rotor thus moves brush A will pass off segment 37a and brush D will pass off segment 41a. Thereupon brush B will engage segment 37b and brush E will engage segment 41b. At this instant the rotor will have moved so that the coils 19b and 30b will occupy the same positions relative to each other as was formerly the case with coils 19a and 30a, that is, with coils 30b slightly in advance of coils 19a, so that the torque effect on the rotor again takes place since coils 19b and 30b are now energized. Now the motion of the rotor causes brushes B and E to disengage from segments 19b and 41b and brushes C and F to engage segments 37c and 41c energizing the coils 19c and 30c and continuing the torque. Continued movement of the rotor disengages brushes C and F from contacts 37c and 41c and brings brushes A and D into engagement with segments 37d and 41d and the cycle above described repeats, the cycle restarting as the brush A and D advance from segment 37 to segment 37 and from segment 41 to segment 41.

From the above description it is thought that the construction and operation of the invention will be fully understood without further explanation.

What is claimed is:

1. An electric motor comprising a stator provided with electro-magnets arranged in pairs, the coils of each pair being wound oppositely to each other, a rotor provided with a less number of radially disposed electro-magnets than the stator arranged in pairs and having the coils of each pair wound oppositely to each other, coils of opposite polarity of the stator and the rotor confronting each other, a stationary distributor, laterally spaced annular series of segments on the distributor, the segments of one series being staggered with respect to the segments of the other series, each segment of one series being connected in parallel to a group of the stator coils the individual coils of which group are arranged at a predetermined angular distance apart, brush holders carried by and revolving with the rotor and disposed at a predetermined angular distance apart, brushes electrically connected together in each holder and having wiping contact with respective annular series of segments, a distributor ring on the distributor for supplying current to one series of segments, said brushes supplying current to the other series of segments for energizing the stator coils, each brush being connected in parallel to a respective group of the rotor coils the individual coils of which group are spaced the same angular distance apart as the individual coils of each stator group, and a common negative connection for the coils of both the stator and the rotor.

2. An electric motor comprising a stator provided with radially disposed electro-magnets arranged in pairs, the coils of each pair being wound oppositely to each other to provide an annular series of stator electro-magnets of north polarity and an annular row of stator electro-magnets of south polarity, a rotor provided with radially disposed electro-magnets arranged in pairs coaxial with the stator electro-magnets, the coils of each pair of rotor electro-magnets being wound oppositely to each other to provide an annular row of electro-magnets of north polarity confronting the annular row of south polarity stator electro-magnets and an annular row of south polarity electro-magnets confronting the annular row of north polarity stator electro-magnets, a stationary distributor, laterally spaced annular series of segments on the distributor, the segments of one series being staggered with respect to the segments of the other series, each segment of one series being connected in parallel to a group of the stator coils the individual coils of which group are arranged at a predetermined angular distance apart, brush holders carried by and revolving with the rotor and disposed at a predetermined angular distance apart, brushes electrically connected together in each holder and having wiping contact with respective annular series of segments, a distributor ring on the distributor for supplying current to one series of segments, said brushes supplying current to the other series of segments for energizing the stator coils, each brush being connected in parallel to a respective group of the rotor coils the individual coils of which group are spaced the same angular distance apart as the individual coils of each stator group, and a common negative connection for the coils of both the stator and the rotor.

3. An electric motor comprising a stator provided with electro-magnets arranged in pairs, the coils of each pair being wound oppositely to each other, a rotor provided with less number of radially disposed electro-magnets than the stator arranged in pairs and having the coils of each pair wound oppositely to each other, coils of opposite polarity of the stator and the rotor confronting each other, a stationary distributor, a mounting drum for the distributor having a flange, stationary plates between which the flange is yieldably received, means for adjusting the flange a predetermined angular distance to reverse the direction of the motor, laterally spaced annular series of segments on the distributor, the segments of one series being staggered with respect to the segments of the other series, each segment of one series being connected in parallel to a group of the stator coils the individual coils of which group are arranged at a predetermined angular distance apart, brush holders carried by and revolving with the rotor and disposed at a predetermined angular distance apart, brushes electrically connected together in each holder and having wiping contact with respective annular series of segments, a distributor ring on the distributor for supplying current to one series of segments, said brushes supplying current to the other series of segments for energizing the stator coils, each brush being connected in parallel to a respective group of the rotor coils the individual coils of which group are spaced the same angular distance apart as the individual coils of each stator group, and a common negative connection for the coils of both the stator and the rotor.

4. An electric motor comprising a stator provided with electro-magnets arranged in pairs, the coils of each pair being wound oppositely to each other, a rotor provided with a less number of radially disposed electro-magnets than the stator arranged in pairs and having the coils of each pair wound oppositely to each other, coils of opposite polarity of the stator and the rotor confronting each other, a stationary distributor, laterally spaced annular series of segments on the distributor, the segments of one series being staggered with respect to the segments of the other series, each segment of one series being connected in parallel to a group of the stator coils the individual coils of which group are arranged at a predetermined angular distance apart, brush holders carried by and revolving with the rotor and disposed at a predetermined angular distance apart, brushes electrically connected together in each holder and having wiping contact with respective annular series of segments, a distributor ring on the distributor for supplying current to one series of segments, said brushes supplying current to the other series of segments for energizing the stator coils, each brush being connected in parallel to a respective group of the rotor coils the individual coils of which group are spaced the same angular distance apart as the individual coils of each stator group, a brush rotating as a unit with the rotor and to which the negative leads of the rotor coils are connected, a collector ring upon which the brush has wiping engagement, and a common negative connection for the ring and for the coils of the stator.

CHARLES J. DEAL.
LUIGI MANZO.